April 20, 1926.

J. L. HAIGHT, JR

AIRCRAFT BATTERY

Filed Sept. 4, 1925

1,581,203

Inventor
J. L. Haight, Jr.
By Clarence A. O'Brien
Attorney

Patented Apr. 20, 1926.

1,581,203

UNITED STATES PATENT OFFICE.

JOHN L. HAIGHT, JR., OF FORT WORTH, TEXAS.

AIRCRAFT BATTERY.

Application filed September 4, 1925. Serial No. 54,474.

*To all whom it may concern:*

Be it known that I, JOHN L. HAIGHT, Jr., a citizen of the United States, residing at Fort Worth, in the county of Tarrant and State of Texas, have invented certain new and useful Improvements in an Aircraft Battery, of which the following is a specification.

This invention relates to an improved storage battery, and mounting therefor, designed particularly for use in association with air crafts.

The tremendous importance of a battery which will operate successfully in air craft is universally recognized. It seems that the main failure of the ordinary type of storage battery and the means of installation results in the wastage of the electrolyte due to the gyrations of the craft and the landing shocks to which it is subjected.

It is my primary aim to provide an improved battery and mounting to overcome these difficulties, and to assure continuity in the supply of current under any and all conditions while the craft is in flight, or is landing or ascending. This being equally true when the craft is performing unusual feats in flight.

Broadly, the invention has reference to a structure which may be referred to as a universal mounting for an especially constructed battery, together with shock absorbing means between the mounting and the relatively stationary plane.

In the accompanying drawing forming a part of this application, and in which like numerals are employed to designate like parts throughout the same:

Figure 2:
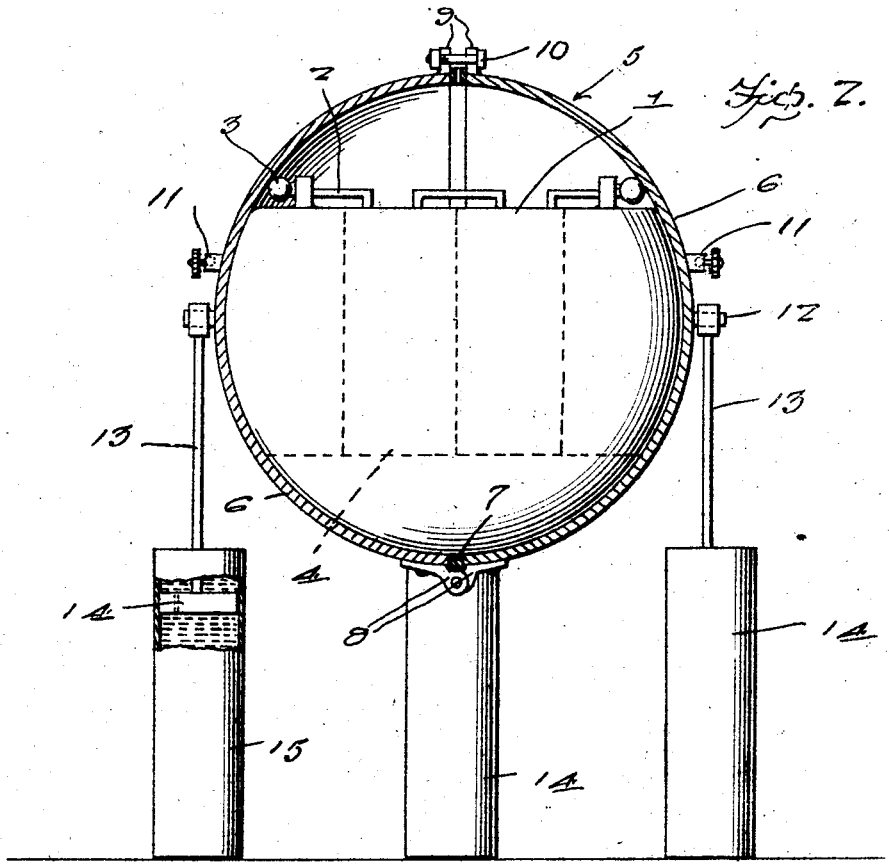
Figure 2 is a section taken approximately upon the plane of the line 2—2 of Figure 1.
Figure 1:
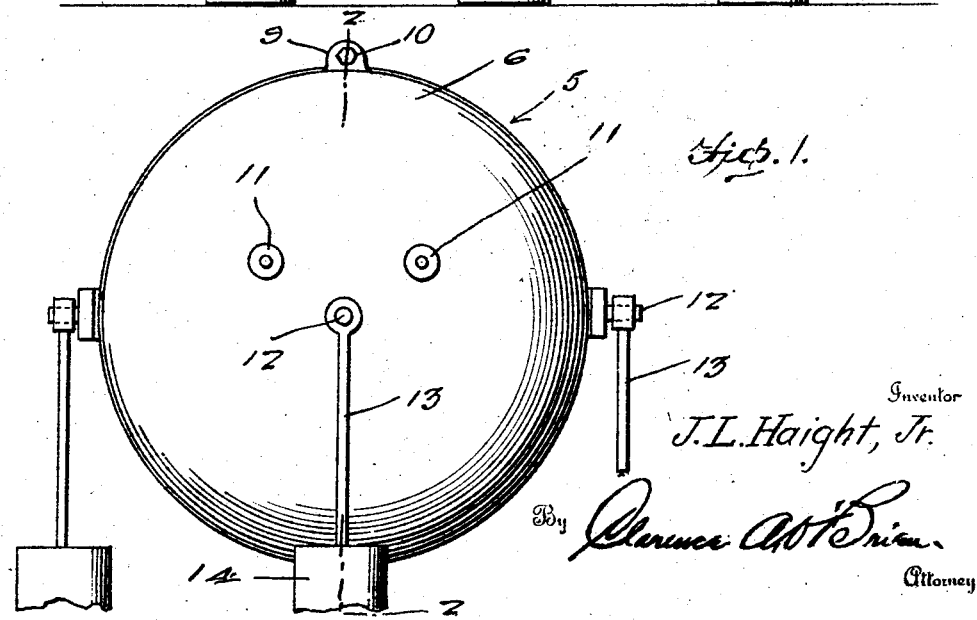
Figure 1 is a side elevation of the improved structure.

Referring to the drawing in detail, and more particularly to Figure 2 it will be seen that the battery is designated generally by the reference character 1. This comprises a housing of hard rubber, the same being in the form of a truncated sphere. Mounted on the flat top of the battery are specially constructed terminals 2 provided upon their extremities with contact balls 3. That portion of the battery below the dotted line 4 is of solid formation or is weighted in any appropriate manner to provide the low center of gravity necessary.

This peculiarly designed battery box or housing is confined in a spherical mounting or casing 5. The mounting is made up of two symmetrical halves or hemispheres 6. Disposed between the adjacent edges of these halves is a ring 7 of insulation material. The lower portions of the halves are connected together by hinge members 8. Attention is directed to the fact that these members are of non-conducting material. Secured to the diametrically opposite portions of the half sections are lugs 9 of insulation material through which a bolt 10 of insulation passes, thus connecting the sections in assembled relation. Mounted on the exterior of the metallic halves 6 at substantially diametically opposite points are binding posts 11. It will be noted that there are two binding posts on each half, these constitute the positive and negative connections. It will be further noted that these are disposed slightly above the horizontal center, and with the arrangement shown when the craft executes a lateral turn through approximately one-hundred-eighty-degrees, the consequent reversal of the polarity will not short circuit or interrupt the current. In this way each hemisphere has a lead cable, and a ground cable. Projecting from the central portions of the hemispheres at circumferentially spaced points are lugs 12 with which depending rods 13 are connected. These rods are connected at their bottoms to piston heads 14 which are mounted for reciprocation in cylinders 15. These cylinders are filled with oil which circulates slowly through one or more apertures in the piston heads whereby to produce shock absorbers. It may also be added that the insulating ring 7 is formed with a plurality of small perforations in the top most quadrant to furnish air. Moreover, in practice, the inside of the casing is covered with a film of light weight grease to eliminate undue friction and to check sulphation of the terminals.

From the foregoing description and drawings it is obvious that I have evolved and produced a novel storage battery and mounting which permits practical uses in air crafts. The battery itself is approximately two thirds of a sphere in shape with the housing made of hard rubber, the lower half being weighted to provide the low center of gravity necessary. The battery is provided with spherical contacts on its terminals establishing constant contact with the internal wall of the globular mounting. The mounting is composed of two halves hingedly connected together and made up of the metallic half sections, preferably steel. The supports for the mounting and battery form shock absorbers, the same being connected to the mounting at its equator and at intervals of approximately ninety degrees. These particular supports are exceedingly desirable in landing. In operation, the battery maintains its equilibrium regardless of the position of the craft. This is due to the fact that the battery and containers are spherical, and the low center of gravity in the battery keeps it upright substantially under all conditions. It is therefore believed that a practical and successful device of this kind has been provided. Moreover, it is thought that by considering the description in connection with the drawings, these advantages and the construction of the device will be very plain. Therefore, a more lengthy description is throught unnecessary.

While the preferred embodiment of the invention has been shown and described, it is to be understood that minor changes coming within the field of invention claimed may be resorted to if desired.

Having thus described the invention, what I claim as new is:—

1. In a structure of the class described, a storage battery of spherical form having a weighted bottom providing a center of gravity, and a spherical mounting in which said battery is confined, said mounting being adapted to be supported upon a craft and being relatively movable with respect to the perpendicular battery.

2. In a structure of the class described, a storage battery of truncated spherical design embodying terminals having ball-like contacts upon their extremities, a spherical mounting in which said battery is confined, said ball-like extremities being in constant contact with the inner wall of said mounting.

In testimony whereof I affix my signature.

JOHN L. HAIGHT, Jr.